(12) United States Patent
Shibutani

(10) Patent No.: US 9,819,415 B2
(45) Date of Patent: Nov. 14, 2017

(54) INTERFERENCE CANCELLATION DEVICE AND INTERFERENCE CANCELLATION METHOD

(71) Applicant: NEC Corporation, Tokyo (JP)

(72) Inventor: Makoto Shibutani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/264,085

(22) Filed: Sep. 13, 2016

(65) Prior Publication Data

US 2017/0085321 A1   Mar. 23, 2017

(30) Foreign Application Priority Data

Sep. 17, 2015 (JP) ................................. 2015-183658

(51) Int. Cl.
   *H04B 10/2507*   (2013.01)
   *H04B 10/61*   (2013.01)
   *H04B 10/58*   (2013.01)

(52) U.S. Cl.
   CPC ......... *H04B 10/2507* (2013.01); *H04B 10/58* (2013.01); *H04B 10/6161* (2013.01)

(58) Field of Classification Search
   CPC .............................................. H04B 10/2507
   USPC ....................................................... 398/116
   See application file for complete search history.

(56) References Cited

U.S. PATENT DOCUMENTS

| 5,371,625 A | * | 12/1994 | Wedding | .......... H04B 10/25137 398/141 |
| 5,767,955 A | * | 6/1998 | Konno | ............... G01M 11/3109 324/534 |
| 2005/0089296 A1 | * | 4/2005 | Furusawa | .............. G02B 6/266 385/140 |
| 2017/0052091 A1 | * | 2/2017 | Mori | .................... G01M 11/088 |

FOREIGN PATENT DOCUMENTS

| JP | 2001-160778 A | 6/2001 |
| JP | 2004-242224 A | 8/2004 |

* cited by examiner

*Primary Examiner* — Don N Vo
(74) *Attorney, Agent, or Firm* — Wilmer Cutler Pickering Hale and Dorr LLP

(57) ABSTRACT

An interference cancellation device includes: an interference signal generation unit including a buffer circuit that accumulates a first digital signal, delays the first digital signal, and outputs the first digital signal as a second digital signal and a digital signal processing circuit that processes the second digital signal in such a way as to have the same optical characteristic change as a reflected light whose optical characteristic changes according to the characteristic of an optical fiber transmission path, wherein the reflected light is a light reflected at a reflection point of the path when a transmission signal light modulated by the first digital signal is transmitted through the path, and outputs the second digital signal as an interference signal; and a subtraction unit that subtracts the interference signal from a third digital signal obtained by converting a reception signal light into an electric signal and outputting the result.

20 Claims, 5 Drawing Sheets

INTERFERENCE CANCELLATION DEVICE AND INTERFERENCE CANCELLATION METHOD

This application is based upon and claims the benefit of priority from Japanese Patent Application No. 2015-183658, filed on Sep. 17, 2015, the disclosure of which is incorporated herein in its entirety by reference.

TECHNICAL FIELD

The present invention relates to an interference cancellation device and an interference cancellation method and in particular, relates to an interference cancellation device and an interference cancellation method used for a digital coherent optical transmission system.

BACKGROUND ART

In the digital coherent optical transmission system, an optical signal which propagates through an optical fiber transmission path is coherently received, the received signal is converted into an electric signal, and then, waveform equalization processing such as wavelength dispersion compensation or the like is performed to the electric signal by a digital signal processing. By performing this process, the waveform distortion of a signal light which occurs when the signal light is transmitted at an ultrafast speed through an optical fiber can be compensated with a high degree of accuracy. In the digital coherent optical transmission system, an expensive optical component for wavelength dispersion compensation such as a DCF (Dispersion Compensating Fiber), a TDC (Tunable Dispersion Compensator), or the like is unnecessary.

It has been studied to apply the digital coherent optical transmission system to, for example, a metro access system with a maximum transmission distance of about 80 km or a 100 Gbps (gigabit per second) Ethernet (registered trademark) signal transmission system used for an intra-data center network or an inter-data center network. In particular, it is required to realize such short and middle distance transmission system at a low cost. For this reason, a (single-core bidirectional transmission) configuration in which an optical signal is bi-directionally transmitted and received through one optical fiber, a configuration in which one light source is shared for a light source for transmission and a local light source for reception, and the like are used. When the configuration in which one light source is shared for the light source for transmission and the local light source for reception is used, the wavelength of the transmission signal light is equal to the wavelength of the reception signal light (same-wavelength bidirectional transmission). Further, even when the light source for transmission and the local light source for reception are independently provided, the wavelength of the light source for transmission may be made equal to the wavelength of the local light source for reception to simplify wavelength management.

FIG. 5 is a block diagram showing an example of a configuration of a common optical transmission system 900. The optical transmission system 900 includes optical transceivers 910 and 911 and realizes same-wavelength single-core bidirectional transmission. The optical transceivers 910 and 911 are connected to each other through a single-core optical fiber transmission path 20. A transmission signal 100 is inputted to the optical transceiver 910. A signal processing circuit 810 encodes the transmission signal 100, converts it into a digital signal, performs digital signal processing such as filtering and the like, and performs DA (Digital to Analog) conversion to generate a modulation signal 120. The modulation signal 120 is inputted to an optical modulator 130. The optical modulator 130 modulates a transmission light 150 outputted by a light source 140 by the modulation signal 120 and outputs the modulated signal as a signal light 160. The signal light 160 is outputted to the optical fiber transmission path 20 through an optical coupler 170 and transmitted to the optical transceiver 911.

The optical transceiver 910 receives a signal light 161 from the optical transceiver 911. The signal light 161 is inputted to an optical demodulator 200 through the optical coupler 170. The optical demodulator 200 mixes a local light 210 outputted from the light source 140 with the signal light 161 and outputs a reception signal 220 that is an electric signal. The reception signal 220 is inputted to a signal processing circuit 830. The signal processing circuit 830 performs AD (Analog to Digital) conversion, digital signal processing such as wavelength dispersion compensation, polarization separation, and the like, a decoding process, forward error correction (FEC), and the like to the reception signal 220 and outputs the resultant signal as a transmission signal 101.

The optical transceiver 911 has a configuration and a function that are similar to those of the optical transceiver 910. Namely, the transmission signal 101 is inputted to an optical transceiver 911. A signal processing circuit 811 encodes the transmission signal 101, converts it into a digital signal, performs digital signal processing such as filtering and the like, and performs DA conversion to generate a modulation signal 121. The modulation signal 121 is inputted to an optical modulator 131. The optical modulator 131 modulates the transmission light 151 outputted by the light source 141 by the modulation signal 121 and outputs the modulated optical signal as the signal light 161. The signal light 161 is outputted to the optical fiber transmission path 20 through an optical coupler 171 and transmitted to the optical transceiver 910.

The optical transceiver 911 receives the signal light 160 transmitted from the optical transceiver 910. The signal light 160 is inputted to an optical demodulator 201 through the optical coupler 171. The optical demodulator 201 mixes a local light 211 outputted by the light source 141 with the signal light 160 and outputs a reception signal 221 that is an electric signal. The reception signal 221 is inputted to a signal processing circuit 831. The signal processing circuit 831 performs AD conversion, digital signal processing such as wavelength dispersion compensation, polarization separation, and the like, a decoding process, forward error correction (FEC), and the like to the reception signal 221 and outputs the resultant signal as the transmission signal 100.

In relation to the present invention, patent literature 1 (Japanese Patent Application Laid-Open No. 2001-160778) discloses a technology for suppressing deterioration in reception light sensitivity due to interference light in an optical transmission and reception system in which the wavelength of the reception light is different from the wavelength of the transmission light. Patent literature 2 (Japanese Patent Application Laid-Open No. 2004-242224) discloses a technology for reducing a reflected wave component that appears in the reception signal when the signal transmitted by the transmitter is reflected at a reflection point of an optical fiber transmission path and returns to the receiver on the transmission side.

SUMMARY

An exemplary object of the invention is to provide a technology for suppressing signal quality degradation due to the reflected light in a digital coherent optical transmission system.

An exemplary aspect of the invention includes an interference cancellation device including: an interference signal generation unit including a buffer circuit that accumulates a first digital signal, delays the first digital signal by a predetermined time, and outputs the first digital signal as a second digital signal and a digital signal processing circuit that processes the second digital signal in such a way as to have the same optical characteristic change as a reflected light whose optical characteristic changes according to the characteristic of an optical fiber transmission path, wherein the reflected light is a light reflected at a reflection point of the optical fiber transmission path when a transmission signal light modulated by the first digital signal is transmitted through the optical fiber transmission path, and outputs the second digital signal as an interference signal and a subtraction unit that subtracts the interference signal from a third digital signal obtained by converting a reception signal light containing the reflected light into an electric signal by digital calculation and outputs a signal as a result of the subtraction.

An exemplary aspect of the invention includes an interference cancellation method including: accumulating a first digital signal; delaying the first digital signal by a predetermined time and outputting the first digital signal as a second digital signal; processing the second digital signal in such a way as to have the same optical characteristic change as a reflected light whose optical characteristic changes according to the characteristic of an optical fiber transmission path, wherein the reflected light is a light reflected at a reflection point of the optical fiber transmission path when a transmission signal light modulated by the first digital signal is transmitted through the optical fiber transmission path, and outputting the second digital signal as an interference signal; subtracting the interference signal from a third digital signal obtained by converting a reception signal light containing the reflected light into the electric signal by digital calculation; and outputting a result of the subtraction.

An exemplary aspect of the invention includes a non-transitory recording medium that stores a program for controlling an interference cancellation device which causes a computer of the interference cancellation device to perform: a procedure to accumulate a first digital signal; a procedure to delay the first digital signal by a predetermined time and output the first digital signal as a second digital signal; a procedure to process the second digital signal in such a way as to have the same optical characteristic change as a reflected light whose optical characteristic changes according to the characteristic of an optical fiber transmission path, wherein the reflected light is a light reflected at a reflection point of the optical fiber transmission path when a transmission signal light modulated by the first digital signal is transmitted through the optical fiber transmission path, and output the second digital signal as an interference signal; a procedure to subtract the interference signal from a third digital signal obtained by converting a reception signal light containing the reflected light into an electric signal by digital calculation; and a procedure to output a result of the subtraction.

By using the present invention, signal quality degradation due to the reflected light can be suppressed in the digital coherent optical transmission system.

BRIEF DESCRIPTION OF THE DRAWINGS

Exemplary features and advantages of the present invention will become apparent from the following detailed description when taken with the accompanying drawings in which.

EXEMPLARY EMBODIMENT

Figure 1:
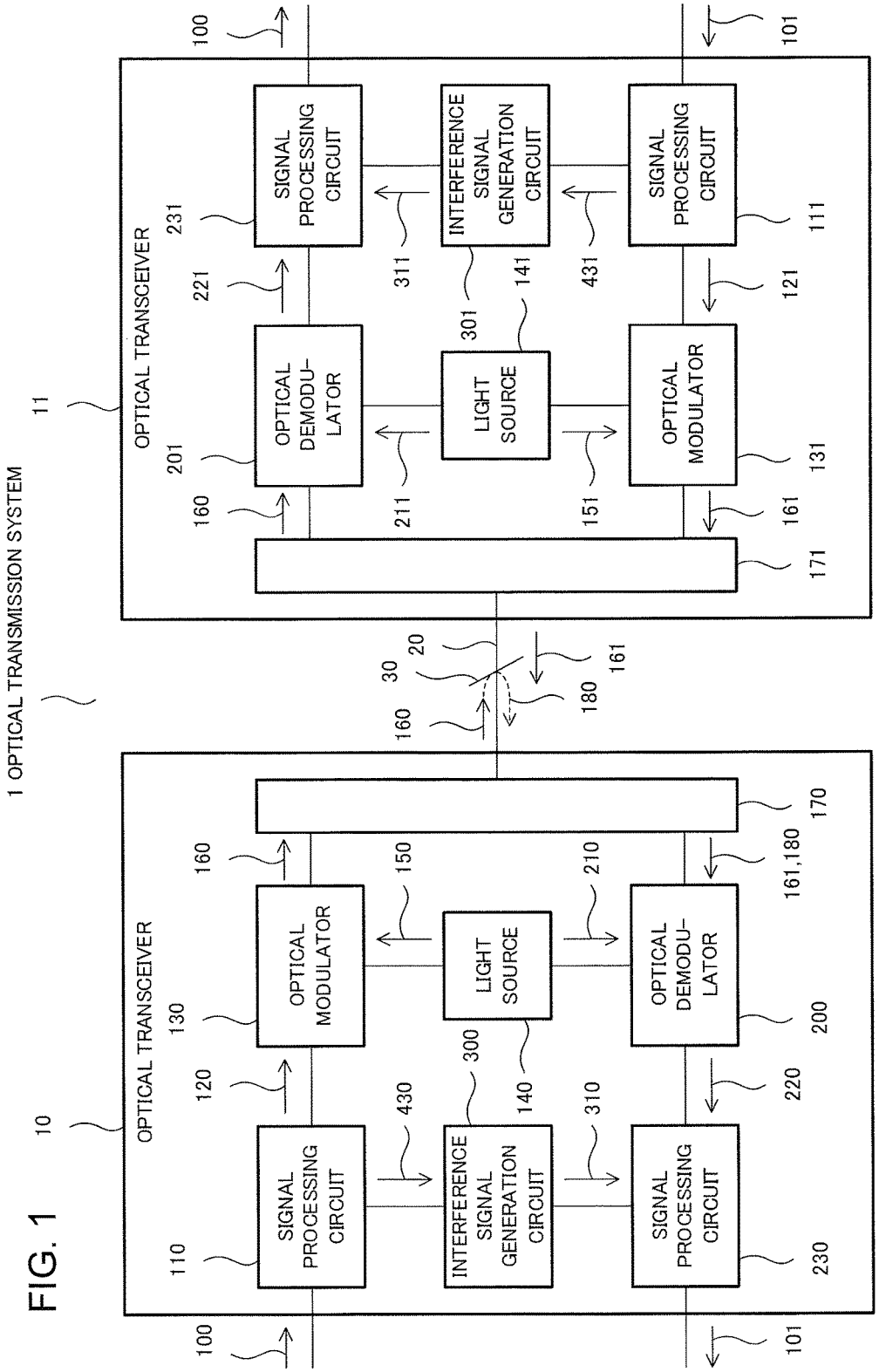
FIG. 1 is a block diagram showing an example of a configuration of an optical transmission system 1 according to a first exemplary embodiment.
Figure 5:
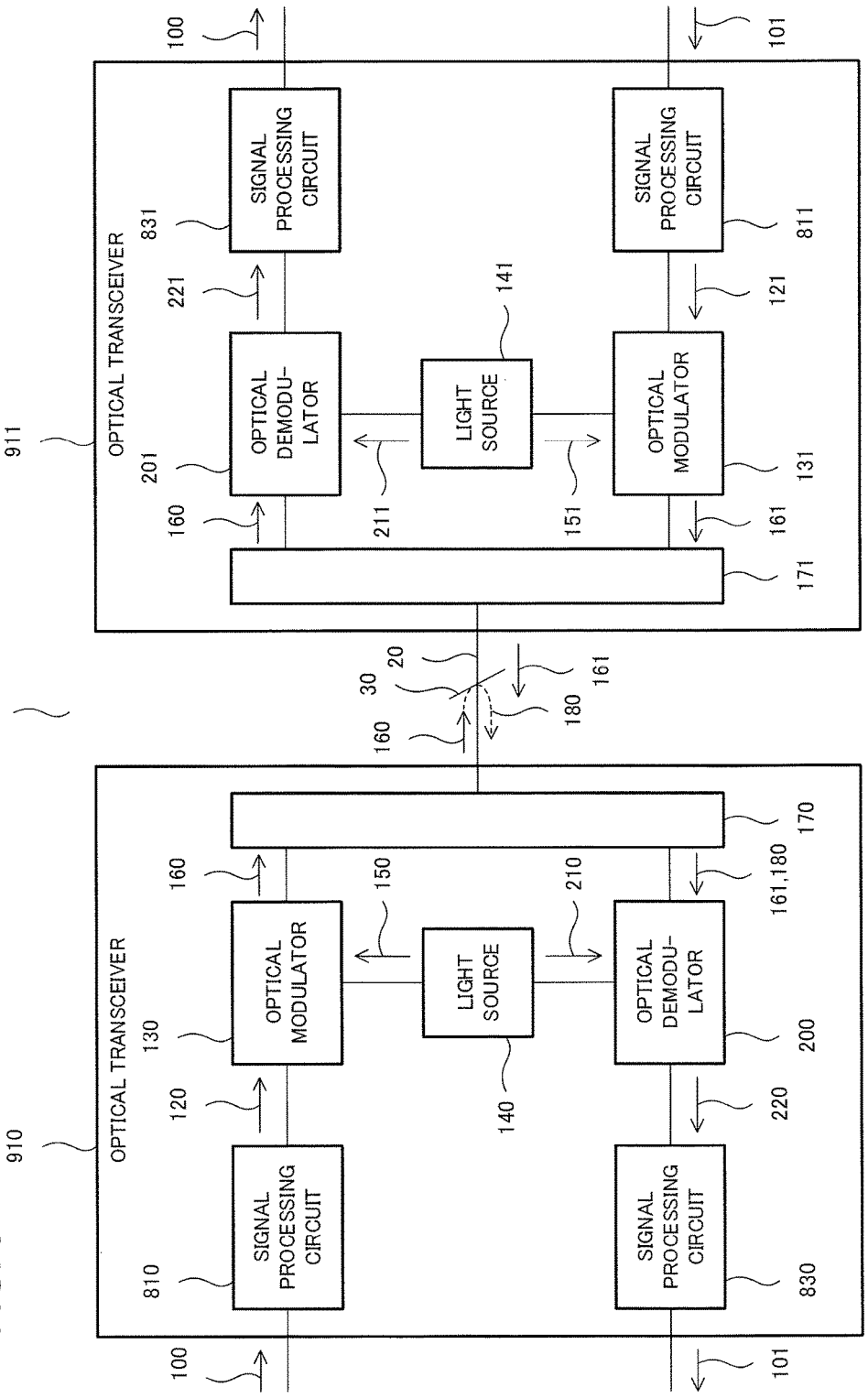
FIG. 5 is a block diagram showing an example of a configuration of a common optical transmission system 900.

FIG. 1 is a block diagram showing an example of a configuration of an optical transmission system 1 according to a first exemplary embodiment. The optical transmission system 1 includes interference signal generation circuits 300 and 301. This is the difference between the optical transmission system 1 and the common optical transmission system 900 described in FIG. 5. The interference signal generation circuit 300 generates an interference signal 310 corresponding to a reflected light 180 based on a signal outputted from a signal processing circuit 110. Specifically, the interference signal generation circuit 300 processes the signal outputted from the signal processing circuit 110 in such a way as to have an optical characteristic change similar to that of the reflected light 180 whose optical characteristic changes according to the optical characteristics such as wavelength dispersion and the like of the optical fiber transmission path 20 and outputs the interference signal 310. Further, in each exemplary embodiment described hereinafter, an arrow attached to the reference code of a signal shown in drawings shows an example of a direction of a signal. Therefore, the direction of the signal is not limit to the direction of the arrow.

A signal processing circuit 230 reduces a component corresponding to the reflected light 180 included in the reception signal 220 by using the interference signal 310 and thereby, reduces an influence of the reflected light 180 on the signal light 161. The signal processing circuit 231 included in the optical transceiver 11 performs the operation similar to that of the signal processing circuit 230. Further, the basic function and the configuration of the signal processing circuits 110, 111, 230, and 231 shown in FIG. 1 are similar to those of the signal processing circuits 810, 811, 830, and 831 shown in FIG. 5. The difference between the signal processing circuits 110, 111, 230 and 231 shown in FIG. 1, and the signal processing circuits 810, 811, 830 and 831 shown in FIG. 5 will be mainly described below. Further, the configuration and the operation of the optical modulators 130 and 131, the light sources 140 and 141, the optical demodulators 200 and 201, and the optical couplers 170 and 171 shown in FIG. 1 are similar to those of these components shown in FIG. 5, respectively and the configuration and the operation of the these components shown in FIG. 5 have been explained above.

Figure 2:
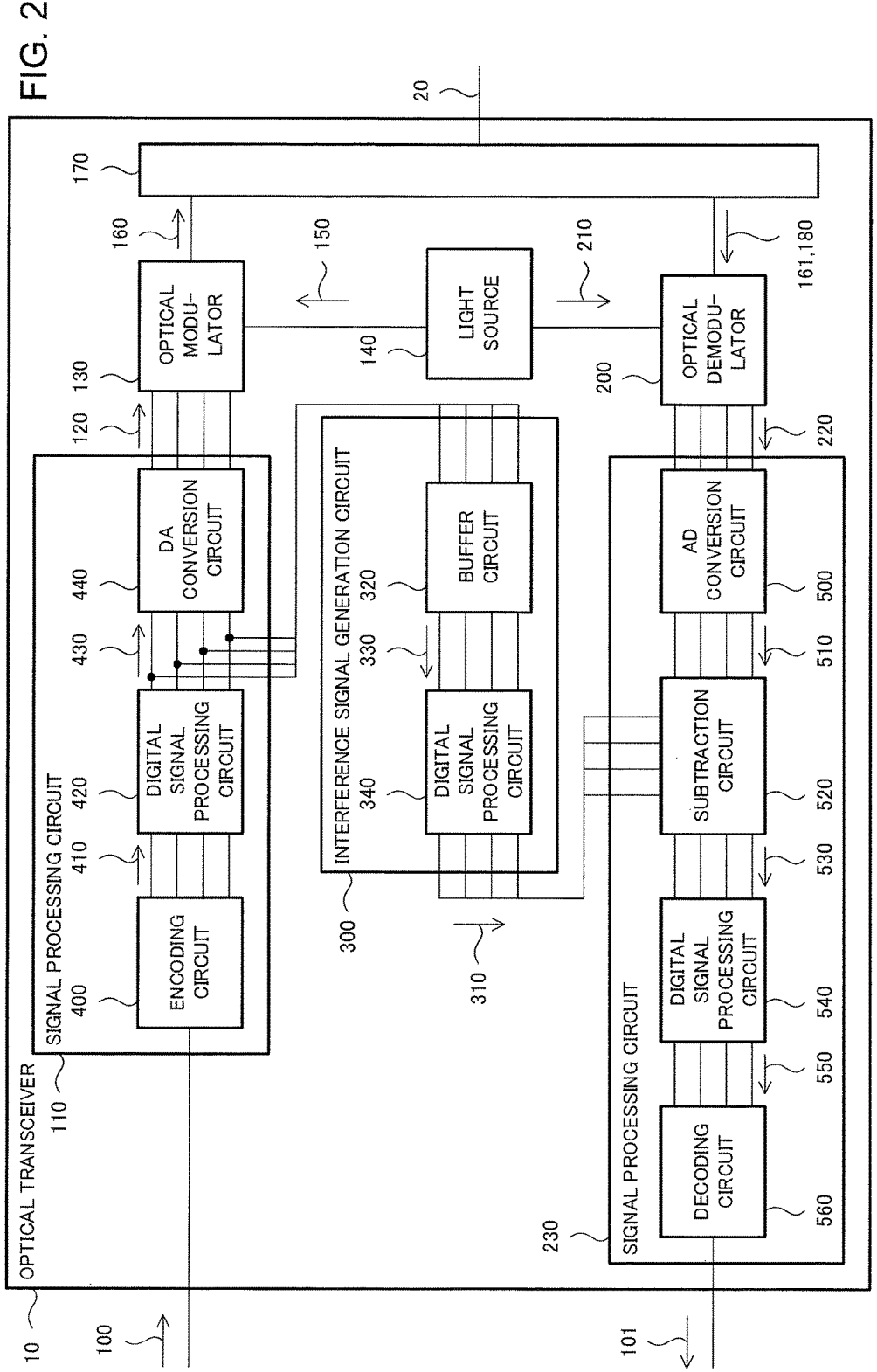
FIG. 2 is a block diagram showing an example of a detailed configuration of an optical transceiver 10 used in an optical transmission system 1.

FIG. 2 is a block diagram showing an example of a detailed configuration of the optical transceiver 10 used in the optical transmission system 1 shown in FIG. 1. The optical transceiver 10 will be described with reference to FIG. 2. The optical transceiver 11 has the configuration and the function that are similar to those of the optical transceiver 10. Therefore, the description about the optical transceiver 11 will be omitted.

In the first exemplary embodiment, the transmission signal 100 is a 100 Gigabit Ethernet (100 GbE) signal whose signal rate is 100 Gbps. In an encoding circuit 400, a forward error correction (FEC) code, a frame signal for frame synchronization, and the like are added to the transmission signal 100 and further, the transmission signal 100 is encoded according to the modulation method and split into multiple lanes. The transmission signal to which these processes are performed is outputted from the encoding circuit 400 as a transmission signal 410.

In the optical transmission system 1, a polarization-multiplexed QPSK (Dual Polarization Quadrature Phase-Shift Keying) method is used as a modulation method. Accordingly, the transmission signal 410 is a set of signals on four lanes. The signal rate of the signal on each lane is about 28 Gbps. In a digital signal processing circuit 420, the transmission signal 410 is converted into a digital signal of which the sampling rate is two samples/symbol and the number of bits is 8 bits. In this case, the bit rate of the digital signal is 448 Gbps/lane that is sixteen times of the bit rate (28 Gbps/lane) of the original signal. The digital signal processing circuit 420 performs digital signal processing such as filtering and the like to this digital signal and outputs the processed signal as a digital signal 430. The digital signal 430 is converted into an analog signal by a DA conversion circuit 440. The analog signal is outputted as the modulation signal 120 that is a set of signals on four lanes. As the optical modulator 130, a polarization multiplexing optical IQ modulator composed of an optical waveguide can be used. Four lanes for the modulation signal 120 correspond to an I (inphase) axis of an X-polarization, a Q (quadrature) axis of an X-polarization, an I axis of a Y-polarization orthogonal to the X-polarization, and a Q axis of a Y polarization of modulation, respectively. The signals on four lanes are inputted to an I axis modulation port of the X-polarization, a Q axis modulation port of the X-polarization, an I axis modulation port of the Y-polarization, and a Q axis modulation port of the Y-polarization of the optical modulator 130, respectively. Therefore, the signal light 160 modulated by a DP-QPSK modulation method is outputted from the optical modulator 130.

The reception of the reflected light 180 and the signal light 161 transmitted by the optical transceiver 11 that is an opposite side device will be described. The signal light 161 and the reflected light 180 received by the optical demodulator 200 are converted into the reception signal 220 that is a set of signals on four lanes by using a polarization diversity optical homodyne detection method. The reflected light 180 is a signal generated when the signal light 160 transmitted by the optical transceiver 10 is reflected at a reflection point 30 of the optical fiber transmission path 20. In an AD conversion circuit 500, the reception signal 220 is converted into a digital signal 510 of which the sampling rate is two samples/symbol and the number of bits is 8 bits. The digital signal 510 includes a component of the signal light 161 and a component of the reflected light 180. The digital signal 510 is processed by a subtraction circuit 520 and then inputted to a digital signal processing circuit 540.

The subtraction circuit 520 subtracts the interference signal 310 from the digital signal 510 by digital calculation and outputs a digital signal 530. A digital signal processing circuit 540 performs signal processing such as wavelength dispersion compensation, polarization separation, polarization dispersion compensation, and the like to the digital signal 530 outputted from the subtraction circuit 520. A decoding circuit 560 performs processing such as decoding, error correction, frame synchronization, and the like to a digital signal 550 outputted from the digital signal processing circuit 540 and outputs the processed signal as the transmission signal 101.

The interference signal generation circuit 300 according to the first exemplary embodiment includes a buffer circuit 320 and a digital signal processing circuit 340. The output signal of the digital signal processing circuit 420 is divided into two signals: a main signal and a branch signal (copy signal). The buffer circuit 320 accumulates the copy signal of the digital signal 430 for each lane and delays the digital signal 430 by a delay time that corresponds to the reflection delay time of the reflected light 180. The time until the digital signal 430 is outputted from the AD conversion circuit 500 as the digital signal 510 after the digital signal 430 is generated, transmitted as the signal light 160, reflected at a reflection point, and received as the reflected light 180 may be used as the reflection delay time. The buffer circuit 320 outputs the digital signal 430 that is delayed to the digital signal processing circuit 340 as a digital signal 330.

Further, in the buffer circuit 320, the digital signal processing circuit 340, and the subtraction circuit 520, the signals on four lanes are independently and concurrently processed.

The digital signal processing circuit 340 processes the digital signal 330 in such a way as to have the same optical characteristic change as the reflected light 180 whose optical characteristic changes according to the characteristic of the optical fiber transmission path 20. The optical characteristic of the reflected light 180 changes according to the optical characteristics such as wavelength dispersion and the like (that are, wavelength dispersion, polarization rotation, and polarization dispersion) of the optical fiber transmission path 20. The optical characteristic change of the reflected light 180 that occurs according to the optical characteristics such as wavelength dispersion and the like includes the optical characteristic change of the signal light 160 that occurs according to the optical characteristics such as wavelength dispersion and the like in a section from the signal transmission point to the reflection point 30 in the optical fiber transmission path 20. Further, the digital signal processing circuit 340 performs spectral shaping to the digital signal 330 in such a way as to have the spectrum change similar to that of the reflected light 180 whose spectrum is affected by a frequency characteristic of the optical modulator 130 and a frequency characteristic of the optical demodulator 200, precisely adjusts the delay time to the digital signal 330, and adjusts the amplitude of the digital signal 330.

When no signal light 161 is received, the signal light 160 is transmitted from the optical transceiver 10 and only the reflected light 180 is received by the optical demodulator 200. By this process, the signal processing circuit 230 can collect data about the reflection delay time, wavelength dispersion of the reflected light 180, and the like. Further, the frequency characteristic of the optical modulator 130 and the frequency characteristic of the optical demodulator 200 can be easily measured in advance. These measured data can be stored in a storage unit such as a memory or the like provided in the optical transceiver 10. The digital signal processing circuit 340 reads these data from the storage unit and whereby, the digital signal processing circuit 340 can calculate a value of wavelength dispersion compensation or the like and a value for spectral shaping that are applied to the digital signal 330. The digital signal processing circuit 340 performs these processes to the digital signal 330 and outputs the processed signal as the interference signal 310.

The interference signal 310 is generated in such a way as to have almost the same amplitude change and timing as those of the component of the reflected light 180 contained in the digital signal 510. Accordingly, by subtracting the interference signal 310 from the digital signal 510 in the subtraction circuit 520, the component of the reflected light 180 contained in the digital signal 510 can be reduced.

The interference signal generation circuit 300 may control the delay time and the amplitude of the interference signal 310 produced by the digital signal processing circuit 340 and the content of the process performed to the digital signal 330 by the digital signal processing circuit 340 in such a way that the transmission signal 101 outputted from the decoding circuit 560 has better quality. For example, in the digital signal processing circuit 340, the amplitude and the delay time of the interference signal 310 may be adjusted in such a way as to minimize an error rate of the transmission signal 101 outputted from the decoding circuit 560.

As described above, in the optical transmission system 1 according to the first exemplary embodiment, the interference signal generation circuit 300 generates the interference signal 310 by processing the signal outputted from the signal processing circuit 110 in such a way as to have an optical characteristic change similar to that of the reflected light 180 whose optical characteristic changes according to the optical characteristics such as wavelength dispersion, polarization separation, and polarization dispersion of the optical fiber transmission path 20 and outputs the interference signal 310. The interference signal 310 is subtracted from the digital signal 510. By this procedure, because the component of the reflected light 180 contained in the digital signal 510 is reduced, in the optical transmission system using a digital coherent optical system, the degradation due to the interference signal such as a reflected return light or the like can be compensated and also at the same time, a wavelength dispersion characteristic, a polarization rotation characteristic, and a polarization dispersion characteristic can be compensated. As a result, by using the optical transmission system 1 according to the first exemplary embodiment, even in the optical fiber transmission path in which many light reflections due to incomplete connection of the connector and the like occur, the influence of the reflected light 180 on the signal light 161 can be reduced because the wavelength dispersion characteristic and the like can be compensated and the high-speed optical transmission can be realized. That is, by using the optical transmission system 1 according to the first exemplary embodiment, the signal quality degradation due to the reflected light can be suppressed in the digital coherent optical transmission system.

Second Exemplary Embodiment

Figure 3:
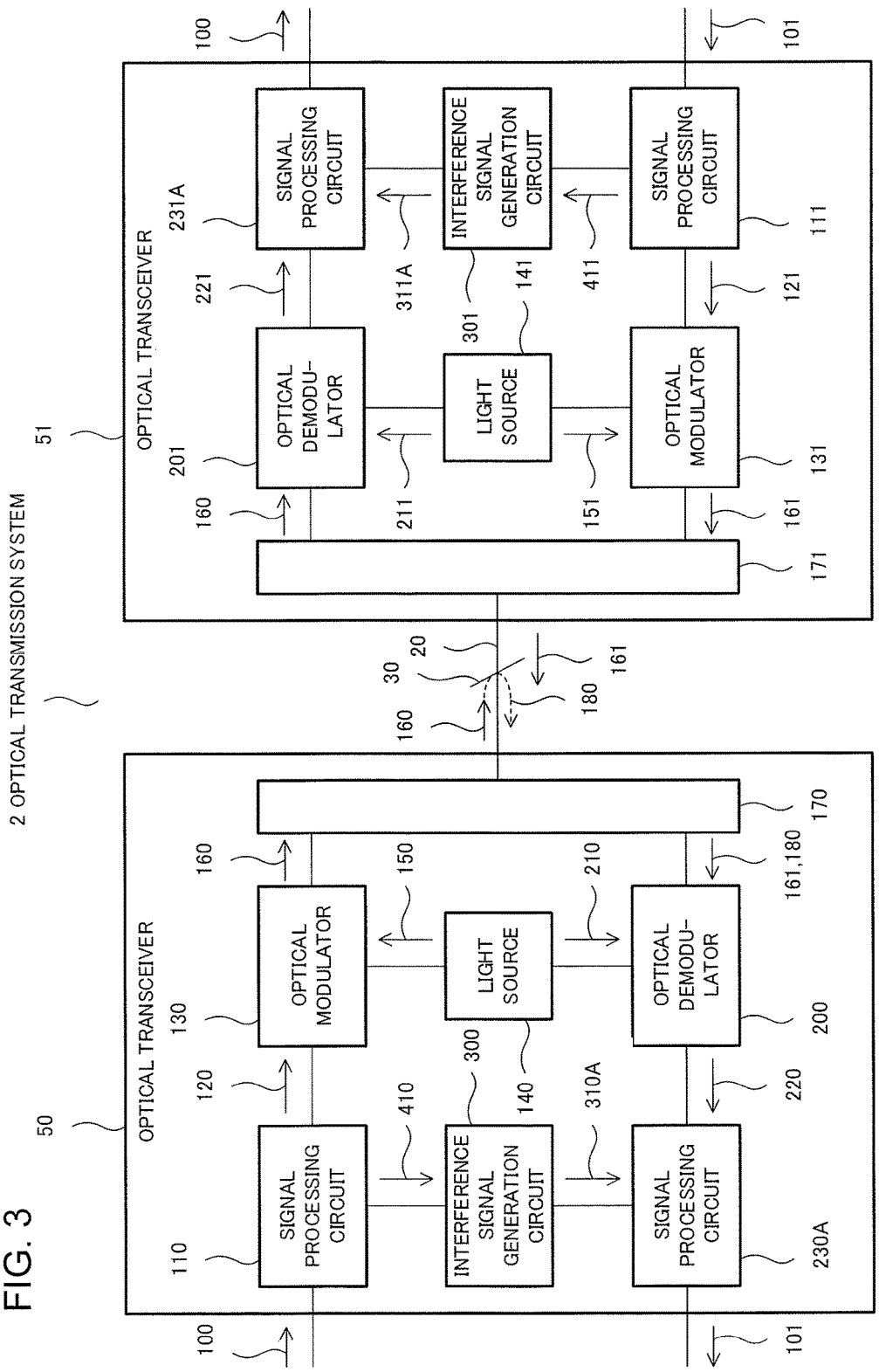
FIG. 3 is a block diagram showing an example of a configuration of an optical transmission system 2 according to a second exemplary embodiment.

A second exemplary embodiment will be described. FIG. 3 is a block diagram showing an example of a configuration of an optical transmission system 2 according to the second exemplary embodiment. The optical transmission system 2 according to the second exemplary embodiment includes optical transceivers 50 and 51 instead of the optical transceivers 10 and 11 shown in FIG. 1. As described with reference to FIG. 4 later, the connection between the interference signal generation circuit 300 and the signal processing circuits 110 and 230A, and the connection between the interference signal generation circuit 301 and the signal processing circuits 111 and 231A, in the optical transceivers 50 and 51, are different from the connections between these elements in the optical transceivers 10 and 11. The configuration and the function of the optical modulators 130 and 131, the light sources 140 and 141, the optical demodulators 200 and 201, and the optical couplers 170 and 171 of the optical transceivers 50 and 51 are similar to the configuration and the function of these elements of the optical transceivers 10 and 11.

The connection between the interference signal generation circuit 300 and the signal processing circuit 110, and the connection between the interference signal generation circuit 300 and the signal processing circuit 230A in the optical transceiver 50 will be described by using FIG. 4. Further, in FIG. 3 and FIG. 4, the same reference numbers are used for the elements having the same function and the signals having the same information as the first exemplary embodiment. In the second exemplary embodiment, the difference between the second exemplary embodiment and the first exemplary embodiment will be mainly described.

Figure 4:
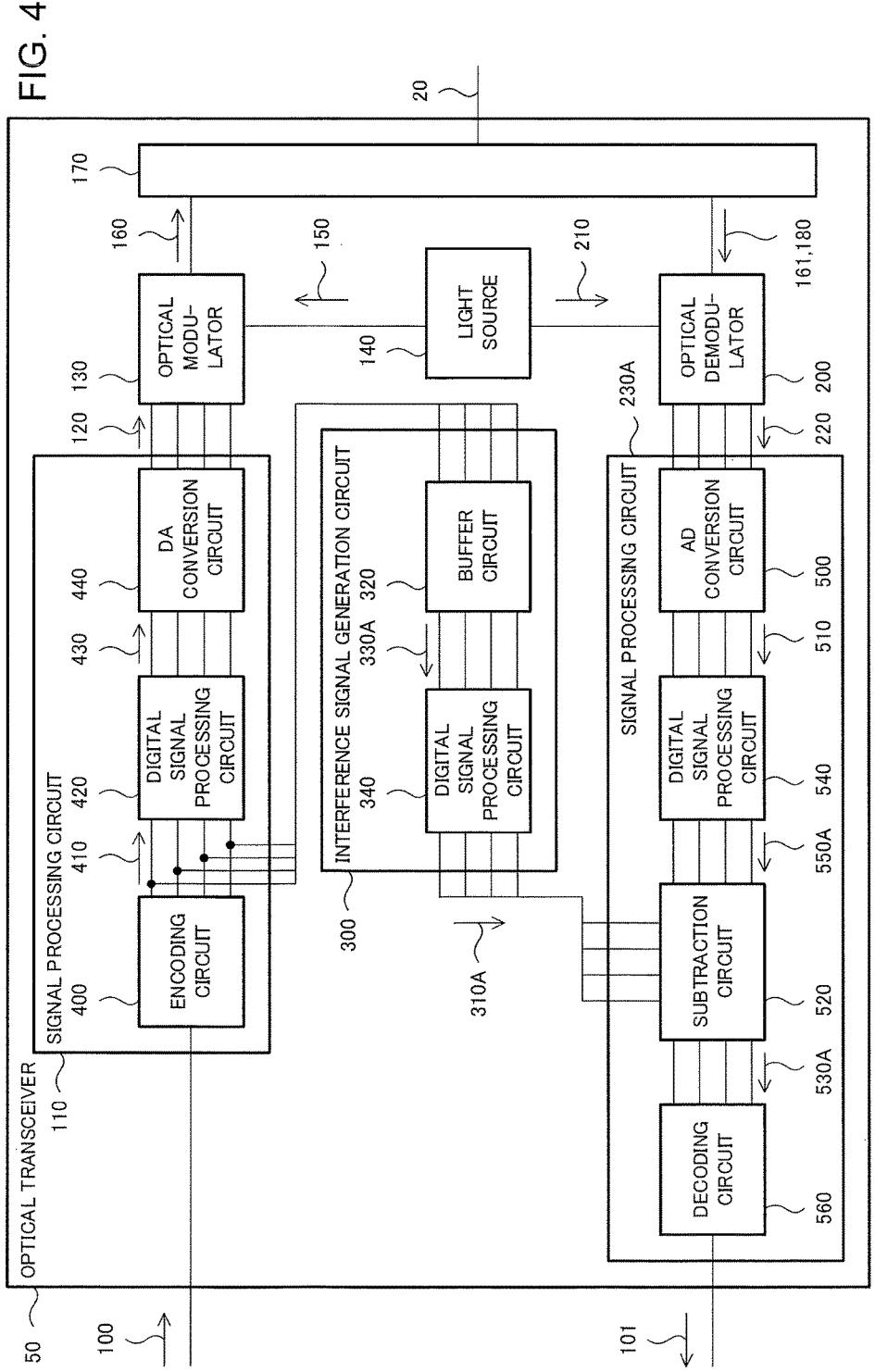
FIG. 4 is a block diagram showing an example of a detailed configuration of an optical transceiver 50 used in an optical transmission system 2.

FIG. 4 is a block diagram showing an example of a detailed configuration of the optical transceiver 50 used in the optical transmission system 2. The optical transceiver 50 is connected to the optical transceiver 51 (not shown) that is an opposite side device through the single-core optical fiber transmission path 20. In the optical transmission system 2, the signal is transmitted bi-directionally by the digital coherent optical transmission system. The modulation scheme of the signal light is DP-QPSK. The configuration and the function of the optical transceiver 51 are similar to those of the optical transceiver 50.

The transmission signal 100 is a 100 GbE signal. In the encoding circuit 400, a forward error correction (FEC) code, a frame signal for frame synchronization, and the like are added to the transmission signal 100 and further, the transmission signal 100 is encoded according to the modulation method and split into multiple lanes. The transmission signal to which these processes are performed is outputted from the encoding circuit 400 as the transmission signal 410.

In this exemplary embodiment, the transmission signal 410 is outputted to the interference signal generation circuit 300. This is a difference between the configuration of the first exemplary embodiment and the configuration of the second exemplary embodiment. The transmission signal 410 is a set of signals on four lanes and the signal rate of the signal on each lane is about 28 Gbps.

In the digital signal processing circuit 420, the transmission signal 410 is converted into a digital signal of which the sampling rate is two samples/symbol and the number of bits is 8 bits. Further, the digital signal processing circuit 420 performs digital signal processing such as filtering and the like to this digital signal and outputs the processed signal as the digital signal 430.

The digital signal 430 is converted into an analog signal by the DA conversion circuit 440. The analog signal is outputted as the modulation signal 120 that is a set of signals on four lanes. The optical modulator 130 modulates the transmission light by the modulation signal 120. The optical modulator 130 outputs the signal light 160 modulated by a DP-QPSK modulation method.

The reception of the signal light 161 performed by the optical transceiver 50 will be described. The signal light 161 is the signal light transmitted by the optical transceiver 51 that is the opposite side device. The optical transceiver 51 generates the signal light 161 by using a procedure similar to the procedure used for the optical transceiver 50 and transmits it to the optical fiber transmission path.

The subtraction circuit 520 of the signal processing circuit 230A according to the second exemplary embodiment is disposed between the digital signal processing circuit 540 and the decoding circuit 560. This is a difference between the signal processing circuit 230A according to the second exemplary embodiment and the signal processing circuit 230 according to the first exemplary embodiment. The optical demodulator 200 converts the received signal light 161 and reflected light 180 into the reception signal 220 that is a set of signals on four lanes by using the polarization diversity optical homodyne detection method. The AD conversion circuit 500 converts the reception signal 220 into the digital signal 510. The digital signal 510 is the digital signal of which the sampling rate is two samples/symbol and the number of bits is 8 bits and contains the component of the signal light 161 and the component of the reflected light 180. The digital signal 510 is inputted to the digital signal processing circuit 540. The digital signal processing circuit 540 performs signal processing such as wavelength dispersion compensation, polarization separation, polarization dispersion compensation, and the like to the digital signal 510. A digital signal 550A outputted from the digital signal processing circuit 540 is inputted to the subtraction circuit 520. The subtraction circuit 520 subtracts the interference signal 310 from the digital signal 550A by digital calculation and outputs a digital signal 530A. The decoding circuit 560 performs processing such as decoding, error correction, frame synchronization, and the like to the digital signal 530A and outputs the processed signal as the transmission signal 101.

The interference signal generation circuit 300 according to the second exemplary embodiment includes the buffer circuit 320 and the digital signal processing circuit 340. The transmission signal 410 that is the output signal of the encoding circuit 400 is divided into two signals: a main signal and a branch signal (copy signal). The buffer circuit 320 accumulates the copy signal of the digital signal 410 for each lane and delays it by a delay time that corresponds to the reflection delay time of the reflected light 180. The time until the transmission signal 410 is outputted from the digital signal processing circuit 540 as the digital signal 550A after the transmission signal 410 is generated, transmitted as the signal light 160, and received as the reflected light 180 may be used as the reflection delay time. The buffer circuit 320 outputs the transmission signal 410 that is delayed to the digital signal processing circuit 340 as a digital signal 330A.

Further, in the buffer circuit 320, the digital signal processing circuit 340, and the subtraction circuit 520 of the optical transceiver 50, the signals on four lanes are independently and concurrently processed.

The digital signal processing circuit 340 processes the digital signal 330A in such a way as to have the same optical characteristic change as the reflected light 180 whose optical characteristic changes according to the characteristic of the optical fiber transmission path 20. The optical characteristic of the reflected light 180 changes according to the optical characteristics such as wavelength dispersion and the like (that are, wavelength dispersion, polarization rotation, and polarization dispersion) of the optical fiber transmission path 20. The optical characteristic change of the reflected light 180 that occurs according to the optical characteristics such as wavelength dispersion and the like includes the optical characteristic change of the signal light 160 that occurs according to the optical characteristics such as wavelength dispersion and the like in a section from the signal transmission point to the reflection point 30 in the optical fiber transmission path 20. Further, the digital signal processing circuit 340 performs spectral shaping to the digital signal 330A in such a way as to have the spectrum change similar to that of the reflected light 180 whose spectrum is affected by a frequency characteristic of the optical modulator 130 and a frequency characteristic of the optical demodulator 200, precisely adjusts the delay time to the digital signal 330A, and adjusts the amplitude of the digital signal 330A.

The signal processing circuit 230A can collect data about the reflection delay time, wavelength dispersion of the reflected light 180, and the like by using a procedure similar to the procedure used for the first exemplary embodiment. Further, the frequency characteristic of the optical modulator 130 and the frequency characteristic of the optical demodulator 200 can be measured in advance like the first exemplary embodiment. These measured data can be stored in a storage unit such as a memory or the like provided in the optical transceiver 50. The digital signal processing circuit 340 reads these data from the storage unit and whereby, the digital signal processing circuit 340 can calculate a value of wavelength dispersion compensation or the like and a value for spectral shaping that are applied to the digital signal 330A. The digital signal processing circuit 340 performs these processes to the digital signal 330A and outputs the processed signal as an interference signal 310A.

The interference signal 310A is generated in such a way as to have almost the same amplitude change and timing as those of the component of the reflected light 180 contained in the digital signal 550A. Accordingly, by subtracting the interference signal 310 from the digital signal 550A in the subtraction circuit 520, the component of the reflected light 180 contained in the digital signal 550A can be reduced.

The interference signal generation circuit 300 according to the second exemplary embodiment may control the delay time and the amplitude of the interference signal 310A produced by the digital signal processing circuit 340 and the content of the process performed to the digital signal 330A by the digital signal processing circuit 340 in such a way that the transmission signal 101 outputted from the decoding circuit 560 has better quality like the first exemplary embodiment. For example, in the digital signal processing circuit 340, the amplitude and the delay time of the interference signal 310A may be adjusted in such a way as to minimize an error rate of the transmission signal 101 outputted from the decoding circuit 560.

As described above, in the optical transmission system 2 according to the second exemplary embodiment, the interference signal generation circuit 300 generates the interference signal 310A by processing the signal outputted from the signal processing circuit 110 in such a way as to have the optical characteristic change similar to that of the reflected light 180 whose optical characteristic changes according to the optical characteristics such as wavelength dispersion, polarization separation, and polarization dispersion of the optical fiber transmission path 20 and outputs the interference signal 310A, the interference signal 310A is subtracted from the digital signal 550A, and whereby, the component of the reflected light 180 contained in the digital signal 550A can be reduced. By this procedure, in the optical transmission system using the digital coherent optical system, the degradation due to the interference signal such as the reflected return light or the like can be compensated and at the same time, a wavelength dispersion characteristic, a polarization rotation characteristic, and a polarization dispersion characteristic can be compensated. As a result, by using the optical transmission system 2 according to the second exemplary embodiment, even in the optical fiber transmission path having poor quality in which many light reflections due to incomplete connection of the connector and the like occur, the high-speed optical transmission can be realized like the first exemplary embodiment. Namely, by using the optical transmission system 2 according to the second exemplary embodiment, the signal quality degradation due to the reflected light can be suppressed in the digital coherent optical transmission system.

Further, in the optical transmission system 2 according to the second exemplary embodiment, the interference signal 310A is generated by using the transmission signal 410 before sampling of the digital signal processing circuit 420. Accordingly, when the optical transceiver 50 according to the second exemplary embodiment is used, a processing speed of the interference signal generation circuit 300 may be low in comparison with the use of the optical transceiver 10 according to the first exemplary embodiment.

Third Exemplary Embodiment

The degradation due to the reflected light can also be compensated by using an interference cancellation device composed of only the interference signal generation circuit 300 shown in FIG. 1 and the subtraction circuit 520. That is, the subtraction circuit 520 subtracts the interference signal 310 from the digital signal 510 that is the reception signal containing the component of the reflected light and outputs the digital signal 530. In the description described below, the reference number shown in FIG. 2 and FIG. 4 will be noted in the parenthesis.

An interference cancellation device according to a third exemplary embodiment includes the buffer circuit (320), the digital signal processing circuit (340), and subtraction means (520). The buffer circuit (320) accumulates first digital signal (430 or 410), delays the first digital signal by a predetermined time, and outputs it as second digital signal (330 or 330A). The digital signal processing circuit (340) processes the second digital signal (330 or 330A) in such a way as to have the same optical characteristic change as the reflected light (180) whose optical characteristic changes according to the characteristic of the optical fiber transmission path and outputs it as the interference signal (310 or 310A). The reflected light (180) is defined as a light reflected at the reflection point (30) (shown in FIG. 1) of the optical fiber transmission path (20) when the transmission signal light (160) modulated by the first digital signal (430 or 410) is transmitted through the optical fiber transmission path (20).

The subtraction means (520) subtracts the interference signal (310 or 310A) from a third digital signal (510 or 550A) obtained by converting reception signal lights (161 and 180) containing the reflected light (180) into the electric signal by digital calculation and output a signal as a result of the subtraction.

Further, the interference cancellation device according to the third exemplary embodiment performs a procedure to accumulate the first digital signal and a procedure to delay the first digital signal by a predetermined time and output the first digital signal being delayed as the second digital signal. Further, the interference cancellation device according to the third exemplary embodiment performs a procedure in which the transmission signal light modulated by the first digital signal is transmitted through the optical fiber transmission path and reflected at the reflection point of the optical fiber transmission path and the second digital signal is processed in such a way as to have the same optical characteristic change as the reflected light whose optical characteristic changes according to the characteristic of the optical fiber transmission path and outputted as the interference signal. Furthermore, the interference cancellation device according to the third exemplary embodiment performs a procedure to subtract the interference signal from the third digital signal obtained by converting the reception signal light containing the reflected light into the electric signal by digital calculation and a procedure to output a result of the subtraction.

In the interference cancellation device according to the third exemplary embodiment that has such configuration, the digital signal processing circuit generates the interference signal which is delayed and whose optical characteristic is changed in such a way as to have an optical characteristic change similar to that of the reflected light whose optical characteristic changes according to the characteristic of the optical fiber transmission path and the subtraction circuit subtracts the interference signal from the third digital signal. By this procedure, the component of the reflected light contained in the third digital signal can be reduced. Namely, the interference cancellation device according to the third exemplary embodiment can suppress the signal quality degradation due to the reflected light.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, the optical transceiver or the interference signal generation circuit according to each exemplary embodiment may include a Central Processing Unit (CPU) and a storage device. The CPU executes a program stored in the storage device and whereby the function of the optical transceiver or the interference cancellation device according to each exemplary embodiment may be realized. The storage device is a fixed storage medium and is non-transitory storage medium. A semiconductor memory or a hard disk drive is used as a recording medium. However, the recording medium is not limited to these devices. For example, the CPU is a computer provided in the interference signal generation circuit 300. The CPU and the storage device may be installed in a circuit other than the interference signal generation circuit.

The whole or part of the exemplary embodiments disclosed above can be described as, but not limited to, the following supplementary notes.

(Supplementary note 1) An interference cancellation device including:
   an interference signal generation unit including
   a buffer circuit that accumulates a first digital signal, delays the first digital signal by a predetermined time, and outputs the first digital signal as a second digital signal and
   a digital signal processing circuit that processes the second digital signal in such a way as to have the same optical characteristic change as a reflected light whose optical characteristic changes according to the characteristic of an optical fiber transmission path, wherein the reflected light is a light reflected at a reflection point of the optical fiber transmission path when a transmission signal light modulated by the first digital signal is transmitted through the optical fiber transmission path, and outputs the second digital signal as an interference signal and a subtraction unit that subtracts the interference signal from a third digital signal obtained by converting a reception signal light containing the reflected light into an electric signal by digital calculation and outputting a signal as a result of the subtraction.

(Supplementary note 2) The interference cancellation device described in supplementary note 1 wherein the optical characteristic of the reflected light changes according to at least one of wavelength dispersion, polarization rotation, and polarization dispersion due to the optical fiber transmission path.

(Supplementary note 3) The interference cancellation device described in supplementary note 1 wherein the predetermined delay time by which the signal is delayed by the buffer circuit is set based on a reflection delay time of the reflected light.

(Supplementary note 4) The interference cancellation device described in supplementary note 2 wherein the predetermined delay time by which the signal is delayed by the buffer circuit is set based on a reflection delay time of the reflected light.

(Supplementary note 5) An optical transceiver including:
the interference cancellation device described in supplementary note 1;
a first signal processing unit that processes a first transmission signal to generate the first digital signal;
a digital-to-analog conversion unit that converts the first digital signal into an analog signal;
an optical modulation unit that modulates the analog signal and transmits the modulated signal as the transmission signal light through the optical fiber transmission path;
an optical demodulation unit that converts the reception signal light inputted from the optical fiber transmission path into an analog electric signal;
an analog-to-digital conversion unit that converts the analog electric signal into a digital signal to generate the third digital signal and outputs the third digital signal to the subtraction unit; and
a second signal processing unit that generates a second transmission signal based on the signal outputted from the subtraction unit as a result of the subtraction.

(Supplementary note 6) An optical transceiver including:
the interference cancellation device described in supplementary note 2;
a first signal processing unit that processes a first transmission signal to generate the first digital signal,
a digital-to-analog conversion unit that converts the first digital signal into an analog signal,
an optical modulation unit that modulates the analog signal and transmits the modulated signal as the transmission signal light through the optical fiber transmission path,
an optical demodulation unit that converts the reception signal light inputted from the optical fiber transmission path into an analog electric signal,
an analog-to-digital conversion unit that converts the analog electric signal into a digital signal to generate the third digital signal and outputs the third digital signal to the subtraction unit, and
a second signal processing unit that generates a second transmission signal based on the signal outputted from the subtraction unit as a result of the subtraction.

(Supplementary note 7) An optical transceiver including:
the interference cancellation device described in supplementary note 3,
a first signal processing unit for processing a first transmission signal to generate the first digital signal,
a digital-to-analog conversion unit for converting the first digital signal into an analog signal,
an optical modulation unit for modulating the analog signal and transmitting the modulated signal as the transmission signal light through the optical fiber transmission path,
an optical demodulation unit for converting the reception signal light inputted from the optical fiber transmission path into an analog electric signal,
an analog-to-digital conversion unit for converting the analog electric signal into a digital signal to generate the third digital signal and outputting the third digital signal to the subtraction unit, and
a second signal processing unit for generating a second transmission signal based on the signal outputted from the subtraction unit as a result of the subtraction.

(Supplementary note 8) An optical transceiver including:
the interference cancellation device described in supplementary note 4;
a first signal processing unit that processes a first transmission signal to generate the first digital signal,
a digital-to-analog conversion unit that converts the first digital signal into an analog signal,
an optical modulation unit that modulates the analog signal and transmits the modulated signal as the transmission signal light through the optical fiber transmission path,
an optical demodulation unit that converts the reception signal light inputted from the optical fiber transmission path into an analog electric signal,
an analog-to-digital conversion unit that converts the analog electric signal into a digital signal to generate the third digital signal and outputs the third digital signal to the subtraction unit, and
a second signal processing unit that generates a second transmission signal based on the signal outputted from the subtraction unit as a result of the subtraction.

(Supplementary note 9) The optical transceiver described in supplementary note 5 wherein a digital signal processing circuit performs spectral shaping to a second digital signal based on a frequency characteristic of the optical modulation unit and a frequency characteristic of the optical demodulation unit and outputs the second digital signal as the interference signal.

(Supplementary note 10) The optical transceiver described in supplementary note 6 wherein a digital signal processing circuit performs spectral shaping to a second digital signal based on a frequency characteristic of the optical modulation unit and a frequency characteristic of the optical demodulation unit and outputs the second digital signal as the interference signal.

(Supplementary note 11) The optical transceiver described in supplementary note 7 wherein a digital signal processing circuit performs spectral shaping to a second digital signal based on a frequency characteristic of the optical modulation unit and a frequency characteristic of the optical demodulation unit and outputs the second digital signal as the interference signal.

(Supplementary note 12) The optical transceiver described in supplementary note 8 wherein a digital signal processing circuit performs spectral shaping to a second digital signal based on a frequency characteristic of the optical modulation unit and a frequency characteristic of the optical demodulation unit and outputs the second digital signal as the interference signal.

(Supplementary note 13) The optical transceiver described in supplementary note 5 wherein an amount of optical characteristic change by which the optical characteristic of the second digital signal is changed in the digital signal processing circuit is controlled based on the quality of the second transmission signal.

(Supplementary note 14) The optical transceiver described in supplementary note 6 wherein an amount of optical characteristic change by which the optical characteristic of the second digital signal is changed in the digital signal processing circuit is controlled based on the quality of the second transmission signal.

(Supplementary note 15) The optical transceiver described in supplementary note 7 wherein an amount of optical characteristic change by which the optical characteristic of the second digital signal is changed in the digital signal processing circuit is controlled based on the quality of the second transmission signal.

(Supplementary note 16) An optical transmission system in which the optical transceivers described in supplementary note 5 are connected in such a way as to face each other through the optical fiber transmission path and same-wavelength bidirectional optical transmission is performed through a single core fiber in a digital coherent optical transmission system.

(Supplementary note 17) An interference cancellation method including:
 accumulating a first digital signal;
 delaying the first digital signal by a predetermined time and outputting the first digital signal as a second digital signal;
 processing the second digital signal in such a way as to have the same optical characteristic change as a reflected light whose optical characteristic changes according to the characteristic of an optical fiber transmission path, wherein the reflected light is a light reflected at a reflection point of the optical fiber transmission path when a transmission signal light modulated by the first digital signal is transmitted through the optical fiber transmission path, and outputting the second digital signal as an interference signal;
 subtracting the interference signal from a third digital signal obtained by converting a reception signal light containing the reflected light into the electric signal by digital calculation; and
 outputting a result of the subtraction.

(Supplementary note 18) The interference cancellation method described in supplementary note 17 wherein the optical characteristic of the reflected light changes according to at least one of wavelength dispersion, polarization rotation, and polarization dispersion due to the optical fiber transmission path.

(Supplementary note 19) The interference cancellation method described in supplementary note 17 wherein the predetermined delay time is set based on a reflection delay time of the reflected light.

(Supplementary note 20) An interference cancellation device including:
 interference signal generation means including a buffer circuit which accumulates a first digital signal, delays the first digital signal by a predetermined time, and outputs the first digital signal as a second digital signal and a digital signal processing circuit which processes the second digital signal in such a way as to have the same optical characteristic change as a reflected light whose optical characteristic changes according to the characteristic of an optical fiber transmission path, wherein the reflected light is a light reflected at a reflection point of the optical fiber transmission path when a transmission signal light modulated by the first digital signal is transmitted through the optical fiber transmission path, and outputs the second digital signal as an interference signal; and
 subtraction means for subtracting the interference signal from a third digital signal obtained by converting a reception signal light containing the reflected light into an electric signal by digital calculation and outputting a signal as a result of the subtraction.

(Supplementary note 21) A program for controlling an interference cancellation device which causes a computer of the interference cancellation device to perform:
 a procedure to accumulate a first digital signal;
 a procedure to delay the first digital signal by a predetermined time and output the first digital signal as a second digital signal;
 a procedure to process the second digital signal in such a way as to have the same optical characteristic change as a reflected light whose optical characteristic changes according to the characteristic of an optical fiber transmission path, wherein the reflected light is a light reflected at a reflection point of the optical fiber transmission path when a transmission signal light modulated by the first digital signal is transmitted through the optical fiber transmission path, and output the second digital signal as an interference signal;
 a procedure to subtract the interference signal from a third digital signal obtained by converting a reception signal light containing the reflected light into an electric signal by digital calculation; and
 a procedure to output a result of the subtraction.

What is claimed is:

1. An interference cancellation device comprising:
 an interference signal generation unit including
  a buffer circuit that accumulates a first digital signal, delays the first digital signal by a predetermined time, and outputs the first digital signal as a second digital signal and
  a digital signal processing circuit that processes the second digital signal in such a way as to have the same optical characteristic change as a reflected light whose optical characteristic changes according to the characteristic of an optical fiber transmission path, wherein the reflected light is a light reflected at a reflection point of the optical fiber transmission path when a transmission signal light modulated by the first digital signal is transmitted through the optical fiber transmission path, and outputs the second digital signal as an interference signal and
 a subtraction unit that subtracts the interference signal from a third digital signal obtained by converting a reception signal light containing the reflected light into an electric signal by digital calculation and outputting a signal as a result of the subtraction.

2. The interference cancellation device described in claim 1 wherein the optical characteristic of the reflected light changes according to at least one of wavelength dispersion, polarization rotation, and polarization dispersion due to the optical fiber transmission path.

3. The interference cancellation device described in claim 2 wherein the predetermined delay time by which the signal is delayed by the buffer circuit is set based on a reflection delay time of the reflected light.

4. An optical transceiver comprising:
 the interference cancellation device described in claim 3;
 a first signal processing unit that processes a first transmission signal to generate the first digital signal, a digital-to-analog conversion unit that converts the first digital signal into an analog signal, an optical modulation unit that modulates the analog signal and transmits the modulated signal as the transmission signal light through the optical fiber transmission path, an optical demodulation unit that converts the reception signal light inputted from the optical fiber transmission path into an analog electric signal, an analog-to-digital conversion unit that converts the analog electric signal into a digital signal to generate the third digital signal and outputs the third digital signal to the subtraction unit, and a second signal processing unit that generates a second transmission signal based on the signal outputted from the subtraction unit as a result of the subtraction.

5. The optical transceiver described in claim 4 wherein a digital signal processing circuit performs spectral shaping to a second digital signal based on a frequency characteristic of the optical modulation unit and a frequency characteristic of the optical demodulation unit and outputs the second digital signal as the interference signal.

6. An optical transceiver comprising:
the interference cancellation device described in claim 2;
a first signal processing unit that processes a first transmission signal to generate the first digital signal,
a digital-to-analog conversion unit that converts the first digital signal into an analog signal,
an optical modulation unit that modulates the analog signal and transmits the modulated signal as the transmission signal light through the optical fiber transmission path,
an optical demodulation unit that converts the reception signal light inputted from the optical fiber transmission path into an analog electric signal,
an analog-to-digital conversion unit that converts the analog electric signal into a digital signal to generate the third digital signal and outputs the third digital signal to the subtraction unit, and
a second signal processing unit that generates a second transmission signal based on the signal outputted from the subtraction unit as a result of the subtraction.

7. The optical transceiver described in claim 6 wherein a digital signal processing circuit performs spectral shaping to a second digital signal based on a frequency characteristic of the optical modulation unit and a frequency characteristic of the optical demodulation unit and outputs the second digital signal as the interference signal.

8. The optical transceiver described in claim 6 wherein an amount of optical characteristic change by which the optical characteristic of the second digital signal is changed in the digital signal processing circuit is controlled based on the quality of the second transmission signal.

9. The interference cancellation device described in claim 1 wherein the predetermined delay time by which the signal is delayed by the buffer circuit is set based on a reflection delay time of the reflected light.

10. An optical transceiver comprising:
the interference cancellation device described in claim 9,
a first signal processing unit for processing a first transmission signal to generate the first digital signal,
a digital-to-analog conversion unit for converting the first digital signal into an analog signal,
an optical modulation unit for modulating the analog signal and transmitting the modulated signal as the transmission signal light through the optical fiber transmission path, an optical demodulation unit for converting the reception signal light inputted from the optical fiber transmission path into an analog electric signal,
an analog-to-digital conversion unit for converting the analog electric signal into a digital signal to generate the third digital signal and outputting the third digital signal to the subtraction unit, and
a second signal processing unit for generating a second transmission signal based on the signal outputted from the subtraction unit as a result of the subtraction.

11. The optical transceiver described in claim 10 wherein a digital signal processing circuit performs spectral shaping to a second digital signal based on a frequency characteristic of the optical modulation unit and a frequency characteristic of the optical demodulation unit and outputs the second digital signal as the interference signal.

12. The optical transceiver described in claim 10 wherein an amount of optical characteristic change by which the optical characteristic of the second digital signal is changed in the digital signal processing circuit is controlled based on the quality of the second transmission signal.

13. An optical transceiver comprising:
the interference cancellation device described in claim 1;
a first signal processing unit that processes a first transmission signal to generate the first digital signal;
a digital-to-analog conversion unit that converts the first digital signal into an analog signal;
an optical modulation unit that modulates the analog signal and transmits the modulated signal as the transmission signal light through the optical fiber transmission path;
an optical demodulation unit that converts the reception signal light inputted from the optical fiber transmission path into an analog electric signal;
an analog-to-digital conversion unit that converts the analog electric signal into a digital signal to generate the third digital signal and outputs the third digital signal to the subtraction unit; and
a second signal processing unit that generates a second transmission signal based on the signal outputted from the subtraction unit as a result of the subtraction.

14. The optical transceiver described in claim 13 wherein a digital signal processing circuit performs spectral shaping to a second digital signal based on a frequency characteristic of the optical modulation unit and a frequency characteristic of the optical demodulation unit and outputs the second digital signal as the interference signal.

15. The optical transceiver described in claim 13 wherein an amount of optical characteristic change by which the optical characteristic of the second digital signal is changed in the digital signal processing circuit is controlled based on the quality of the second transmission signal.

16. An optical transmission system in which the optical transceivers described in claim 13 are connected in such a way as to face each other through the optical fiber transmission path and same-wavelength bidirectional optical transmission is performed through a single core fiber in a digital coherent optical transmission system.

17. An interference cancellation method comprising:
accumulating a first digital signal;
delaying the first digital signal by a predetermined time and outputting the first digital signal as a second digital signal;
processing the second digital signal in such a way as to have the same optical characteristic change as a reflected light whose optical characteristic changes according to the characteristic of an optical fiber transmission path, wherein the reflected light is a light reflected at a reflection point of the optical fiber transmission path when a transmission signal light modulated by the first digital signal is transmitted through the optical fiber transmission path, and outputting the second digital signal as an interference signal;

subtracting the interference signal from a third digital signal obtained by converting a reception signal light containing the reflected light into the electric signal by digital calculation; and outputting a result of the subtraction.

18. The interference cancellation method described in claim 17 wherein the optical characteristic of the reflected light changes according to at least one of wavelength dispersion, polarization rotation, and polarization dispersion due to the optical fiber transmission path.

19. The interference cancellation method described in claim 17 wherein the predetermined delay time is set based on a reflection delay time of the reflected light.

20. An interference cancellation device comprising:

interference signal generation means including a buffer circuit which accumulates a first digital signal, delays the first digital signal by a predetermined time, and outputs the first digital signal as a second digital signal and a digital signal processing circuit which processes the second digital signal in such a way as to have the same optical characteristic change as a reflected light whose optical characteristic changes according to the characteristic of an optical fiber transmission path, wherein the reflected light is a light reflected at a reflection point of the optical fiber transmission path when a transmission signal light modulated by the first digital signal is transmitted through the optical fiber transmission path, and outputs the second digital signal as an interference signal; and subtraction means for subtracting the interference signal from a third digital signal obtained by converting a reception signal light containing the reflected light into an electric signal by digital calculation and outputting a signal as a result of the subtraction.

* * * * *